US009894486B2

(12) United States Patent
Wang et al.

(10) Patent No.: US 9,894,486 B2
(45) Date of Patent: Feb. 13, 2018

(54) TRACKING SERVICE QUEUES USING SINGLE-POINT SIGNAL MONITORING

(71) Applicants: Rutgers, The State University of New Jersey, New Brunswick, NJ (US); Stevens Institute of Technology, Hoboken, NJ (US)

(72) Inventors: Yan Wang, Jersey City, NJ (US); Jie Yang, Hoboken, NJ (US); Yingying Chen, Hoboken, NJ (US); Richard P. Martin, Metuchen, NJ (US); Marco Gruteser, Princeton, NJ (US)

(73) Assignees: Rutgers, the State University of New Jersey, New Brunswick, NJ (US); Stevens Institute of Technology, Hoboken, NJ (US)

(*) Notice: Subject to any disclaimer, the term of this patent is extended or adjusted under 35 U.S.C. 154(b) by 0 days.

(21) Appl. No.: 15/173,181

(22) Filed: Jun. 3, 2016

(65) Prior Publication Data
US 2016/0360373 A1 Dec. 8, 2016

Related U.S. Application Data

(60) Provisional application No. 62/170,455, filed on Jun. 3, 2015.

(51) Int. Cl.
*H04W 24/00* (2009.01)
*H04W 4/02* (2018.01)
*H04W 64/00* (2009.01)
*H04W 4/04* (2009.01)

(52) U.S. Cl.
CPC ............ *H04W 4/025* (2013.01); *H04W 4/04* (2013.01); *H04W 64/006* (2013.01)

(58) Field of Classification Search
None
See application file for complete search history.

(56) References Cited

U.S. PATENT DOCUMENTS 9,008,962 B2* 4/2015 Bandyopadhyay .... G01C 17/38
701/1

OTHER PUBLICATIONS

Spassov et al., Bayesian Approach for Indoor Pedestrian Localisation, Monte Verità / Ascona, Mar. 15.-17, 2006, 6th Swiss Transport Research Conference.*

(Continued)

*Primary Examiner* — Idowu O Osifade
(74) *Attorney, Agent, or Firm* — Fox Rothschild LLP

(57) ABSTRACT

A method of tracking a service queue using a single-point signal monitor in which at least one customer carries a wireless device may include: receiving a received signal strength from the wireless device as a trace; identify first segments of the trace containing mostly positive sloped received signal strength; identify second segments of the trace containing mostly negative sloped received signal; extract attributes from the first and second segments as child variables for two parent nodes in a Bayesian Network in which the two parent nodes respectively model a beginning of service and a leaving period for a service queue; and inputting the extracted attributes into Bayesian Network; and determining a beginning of service and leaving period using the Bayesian Network. The method may also include determining critical time points in a trace using a K-L divergence technique.

12 Claims, 18 Drawing Sheets

(56) References Cited

OTHER PUBLICATIONS

Bauer, D. et al., "Simple Sensors Used for Measuring Service Times and Counting Pedestrians", Transportation Research Record: Journal of the Transportation Research Board, 2011, vol. 2214, No. 1, pp. 77-84.
Bullock, D.M. et al., "Automated Measurement of Wait Times at Airport Security", Transportation Research Record, 2010, No. 2177, pp. 60-68.
Chandrasekaran, G. et al., "Vehicular Speed Estimation Using Received Signal Strength from Mobile Phones", Ubicomp '10, Sep. 26-29, 2010, Copenhagen, Denmark, pp. 237-240.
Ghosh, A. et al., "Modeling and Characterization of Large-Scale WiFi Traffic in Public Hot-Spots", IEEE INFOCOM 2011, pp. 2921-2929.
Kim, M. et al., "Extracting a Mobility Model From Real Uuser Traces", IEEE INFOCOM, 2006, 13 pages.
Manweiler, J. et al., "Predicting Length of Stay at WiFi Hotspots", 2013 Proceedings IEEE INFOCOM, pp. 3102-3110.
Nicholson, A.J. et al., "Breadcrumbs: Forecasting Mobile Connectivity", ACM MobiCom '08, Sep. 14-19, 2008, San Francisco, CA, pp. 46-57.

* cited by examiner

TRACKING SERVICE QUEUES USING SINGLE-POINT SIGNAL MONITORING

RELATED APPLICATIONS AND CLAIM OF PRIORITY

This patent document claims priority under 35 U.S.C. § 119(e) to U.S. provisional patent application No. 62/170,455, filed Jun. 3, 2015. The disclosure of the priority application is fully incorporated into this document by reference.

BACKGROUND

This disclosure relates to tracking of wireless devices, and more particularly, to tracking of wireless devices using a single-point signal monitor.

The popular, almost addictive, usage of wireless devices and their data-intensive apps create novel opportunities to exploit their network traffic for monitoring and optimizing real-world processes. For example, cellular call data records can be used to infer large scale transportation patterns, or cellular signal traces may allow inferring the level of congestion on roadways.

A familiar and often frustrating occurrence is waiting in service queues in retail stores, banks, theme parks, hospitals and transportation stations. A service queue in these environments may include the waiting period, the service period and the leaving period. As people arrive, the waiting period is the time spent waiting for the service. During the service period people receive service, such as paying for items in a store or checking-in travel bags at the airport. A person exits the service area during the leaving period. Note that the concept of a service queue can be interpreted loosely, people do not need to stand in line but could sit in a waiting room and do not always need to be served in a strict first in, first out order.

Real-time quantification of the waiting and service times in such service queues allows optimizing service processes, ranging from retail, to heath care, to transportation and entertainment. For example, many hospital emergency department surveys have average waiting times of several hours. More complete waiting and service time statistics allow customers, travelers, managers and service providers to make changes to their staffing and/or procedural processes. For example, an airport checkpoint might be experiencing abnormal delays and require interventions by diverting or relocating screeners from queues with shorter waiting times. Customers also can benefit, for example, knowing at what times retail store checkout lines can be expected to be shorter, a customer can decide whether to stay in the queue or go to do more urgent tasks. Managers can use such information to make staffing decisions based on the service length. For example, during particular hours in a day, service times may grow at a coffee shop due to increased demands for espresso drinks compared to other items. In such a case, it might be more effective to change the staffing to use experienced baristas as opposed to simply adding staff. A hospital emergency department may shift nursing staff to assist with triage when waiting times become too long. In the transportation field, bus and train schedules or boarding and payment processes could be adjusted.

Existing solutions to the queue monitoring problem rely on cameras, such as infrared or special sensors, such as floor mats, and usually require sensors at multiple locations. These techniques using wireless networks were too coarse-grained to differentiate between the waiting and service time. Moreover, these solutions require multiple sensors to fully monitor a single longer queue, which increases installation and system cost. Further, earlier camera solutions are prone to occlusion and may require multiple cameras (networked together) to provide a complete measurement. Multi-camera setups are more costly in hardware and installation and may encounter privacy concerns because customers' facial identities are captured by the cameras.

This document describes devices and methods that are intended to address issues discussed above and/or other issues.

SUMMARY

In one embodiment, a device for tracking service queues may include an antenna configured to receive wireless signals from multiple mobile wireless devices. Each of the mobile wireless devices may be carried by a customer as the customer enters a premises, waits in a service queue to be serviced, or leaves the service queue. The tracking device may also include a receiving circuit that is coupled to the antenna and used to measure the signal strength amplitude of the received wireless signals from the antenna. The tracking device may also include a processing device coupled to the receiving circuit, and non-transitory computer readable medium containing programming instructions that will cause the processing device to perform a number of calculations.

In one embodiment, the processing device may be programmed to receive a trace that includes multiple received wireless signal strength amplitudes from selected mobile wireless devices in a temporal order. In one embodiment, a wireless device may be selected if the signal strength amplitude received from the antenna is higher than a threshold value. The time span of the trace may start from a time when the selected mobile wireless device enters a receivable range of the antenna to a time when the selected mobile wireless device exits the receivable range. The processing device may also determine the slope of the trace and identify segments with mostly positive slopes and segments with mostly negative slopes. The processing device may extract attributes from these identified segments, and apply a Bayesian Network model to these extracted attributes.

In one embodiment, the Bayesian Network model is designed to include two parent nodes, each respectively modeling the beginning of service and the leaving period of a service queue. Given a trace and the extracted attributes from the trace, the processing device may use the Bayesian Network model to compute the beginning of service and the leaving period of the service queue.

In one embodiment, the tracking device may include an additional antenna and the receiving circuit can be configured to measure the signal strength amplitude of the received wireless signals from the additional antenna. In one embodiment, the processing device may be programmed to combine the traces of received wireless signals from two antennas. In one embodiment, the processing device may use the max or the average to combine the traces. The processing device may also perform calibration of the received trace to remove noise from the trace, or identify a removal point and remove a time period from the trace based on the identified removal point.

Alternatively and/or additionally, the processing device may be programmed to determine the end of leaving time of the service queue from the trace, and use a K-L divergence technique to determine the leaving point from the trace based on the end of leaving time so that the leaving point separates the trace before the determined end of leaving time into two parts that present significantly distinctive distributions from each other. Additionally, the processing device may also be programmed to use a K-L divergence technique to determine the beginning of service time from the trace based on the determined leaving point so that the beginning of service time separates the trace before the leaving point into two parts that present significantly distinctive distributions from each other. Alternatively and/or additionally, the processing device may be programmed to quantize the slope of the trace prior to determining the leaving point and the beginning of service time, by normalizing the computed slope and quantizing the normalized slope.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "Bayesian Network," "naive Bayesian Network" refers to corresponding terms within the field of pattern recognition, machine learning and artificial intelligence.

A "computer" or "computing device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "wireless device" refers to any device capable of wireless communications such as WiFi, Bluetooth, near-field-communication (NFC) that use radio frequency (RF). A "mobile wireless device" refers to any portable and movable wireless device such as a mobile phone, a smart phone, a wireless router, a wireless access point, a wireless watch or other wearables capable of wireless communications, etc.

The term "trace" or "RSS trace" refers to a plurality of received wireless signal strength amplitudes from a mobile wireless device in a temporal order from the time the mobile wireless device enters a receivable range of the monitoring device to the time the mobile wireless device exits the receivable range of the monitoring device.

Figure 1:
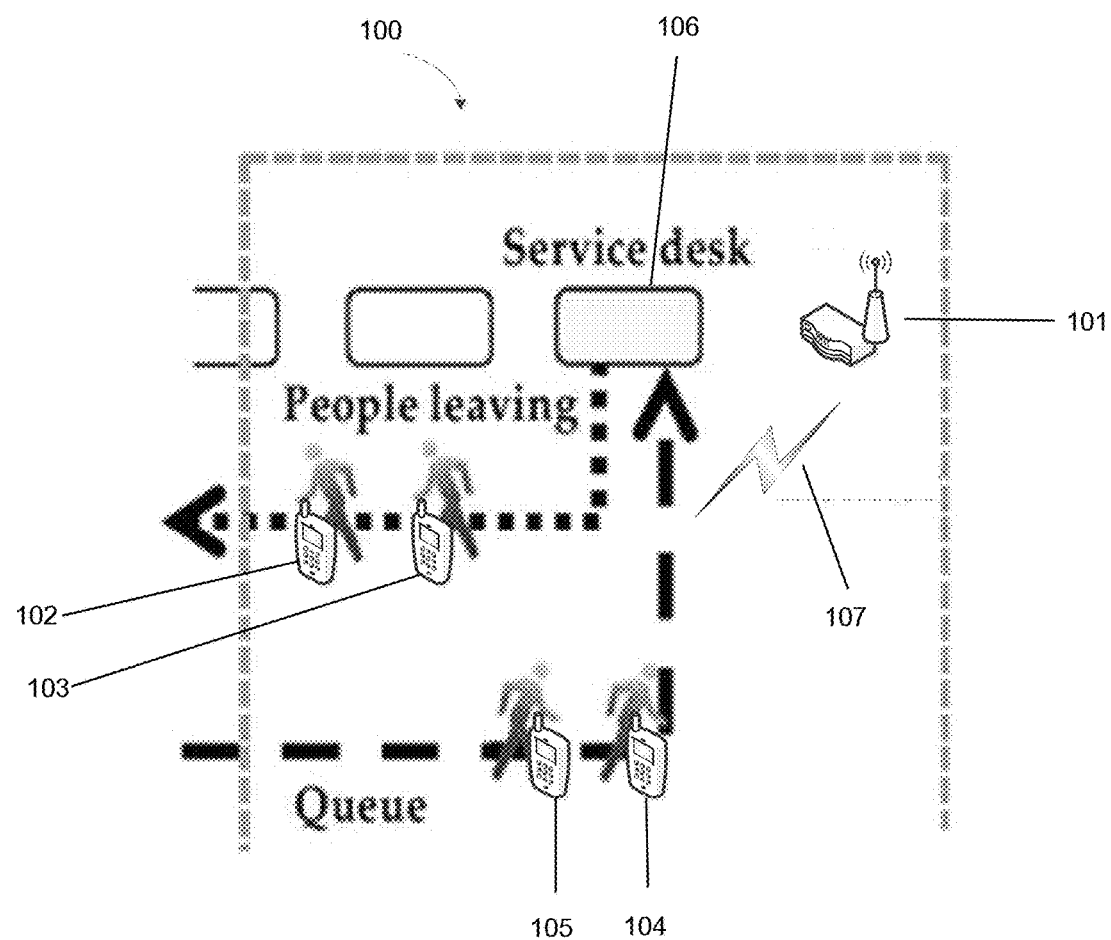
FIG. 1 illustrates a service queue tracking system according to an embodiment.

With reference to FIG. 1, in some embodiments, a service queue tracking system 100 may include a monitoring device 101 placed near a service point 106, and configured to communicate with one or more mobile wireless devices 102-105 through a communication link 107, each of the wireless device representing a human subject (e.g. customer, user, client, patient etc.) entering a premises, waiting in the service queue to be serviced, leaving the queue after being services, or leaving the premises. In one embodiment, mobile wireless devices may be a cellphone or a smartphone that the customer carries. The smartphone may be equipped with any of the wireless communication capabilities, such as WiFi or Bluetooth.

In some embodiments, the monitoring device 101 can be a WiFi monitor and can be placed close to the service area to monitor service queues in real-time through examining the unique patterns exhibited in the WiFi signals, which are extracted from wireless devices carried by people waiting in the queue. The service queue tracking system can also utilize a WiFi hotspot if it is located close to the service area. In one embodiment, each of the mobile wireless devices in the service queue may emit wireless signals, which are received by the monitoring device 101 at different signal strength depending on the distance of the wireless mobile to the monitoring device. Because the monitor is located at the service area, each phase of the queue creates unique signal patterns that can be used to identify different periods of the queue for statistical queue measurement.

Figure 2:
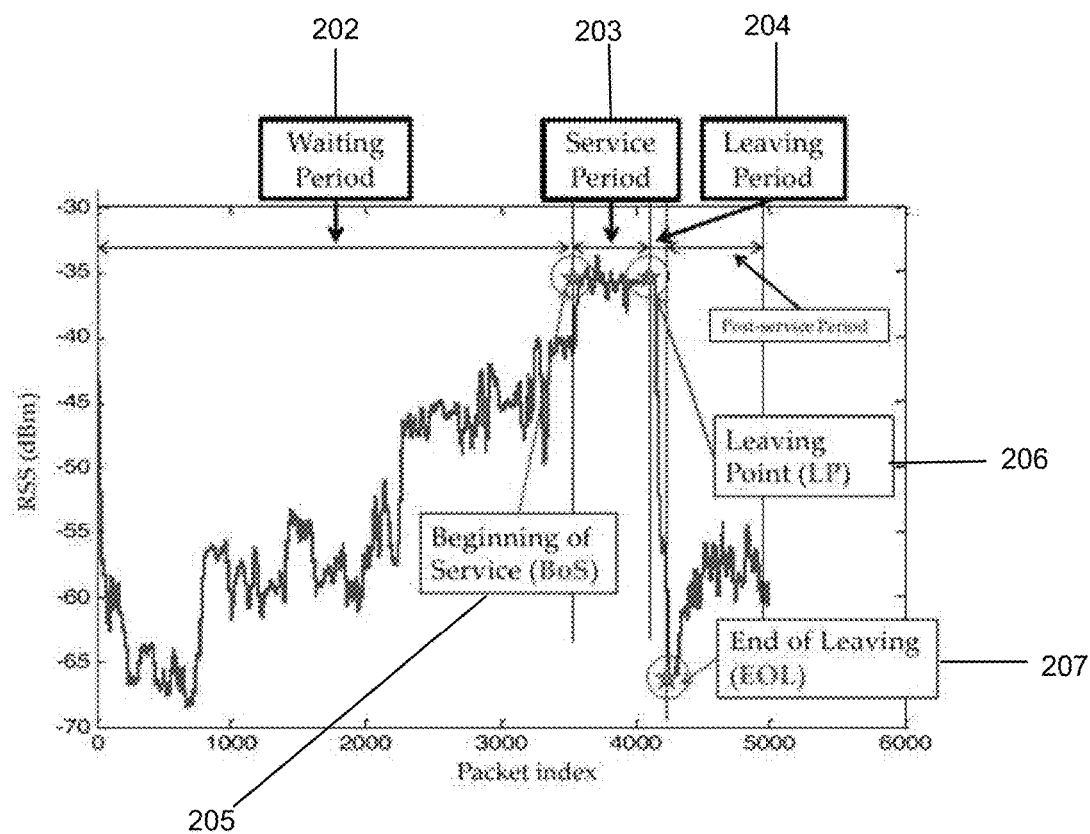
FIG. 2 is illustrates an example of special queue-related patterns embedded in the received signal strength (RSS) trace collected from a wireless device in a service queue.

With reference to FIG. 2, the signal strength of packets emitted from cell phones to the monitoring device placed near a service point is shown. As can be seen, periods of a service queue can be separated by several critical time points, for example, beginning of service (BoS) 205, leaving point (LP) 206, and end of leaving (EoL) 207, in a temporal order. BoS is the first time point, which separates the waiting period 202 and the service period 203, while LP tells when the service is done and the customer is about to leave the service point. The third time point, EoL 207, indicates the time when the customer has left the service area, such as goes to a seat or exits the facility.

The received signal strength (RSS) trace reflects the pattern of the distance between the person carrying the phone to the service point. In particular, the RSS may exhibit the following unique patterns: (1) it may have a slowly increasing trend during the waiting period 202; (2) it may become stable at high RSS values when the person carrying the phone is in the service period 203; and (3) it may drop quickly when the person leaves the service desk after having received service in the leaving period 204. As can be shown, the exhibited unique pattern of wireless signal strength associated with a service queue depends largely on the distance between the phone and the service point at any point of time. Thus, a single-point monitoring device placed near the service point may help accurately discerning critical time points in the situation of multi-path, shadowing, and fading components of a signal due to the movement of customers. Further, the wireless signal strength pattern can be achieved when at least some people but not all in the queue carry wireless devices that can communicate wirelessly, such as in WiFi, with the monitoring device.

In one embodiment, the occurrence of signals emanating from a customer's smartphone can be used since it is increasingly the case as people tend to fiddle with their wireless devices while waiting in service queues. Alternatively and/or additionally, to encourage users to turn on WiFi on their mobile wireless devices, as part of the tracking system, a vendor offering services in a premises can distribute a special app to be installed on its customers' smartphones. Many venues now offer loyalty apps that customers may use while paying. The special app can run on a smartphone and can generate periodical beacons.

In one embodiment, WiFi is chosen because (i) its range is sufficiently large to cover the entire queue in most cases, especially for large-size queues, which usually requires the installation of multiple cameras or sensors in order to obtain the complete view of the queue; (ii) it may be easier to monitor WiFi traffic (compared to the complexities tracking Bluetooth frequency hopping sequences, for example); and (iii) WiFi traffic is poised to increase due to the WiFi offloading trend.

Alternatively and/or additionally, the service queue tracking system may also use other wireless technologies, such as Bluetooth, which may be discoverable of about 10 meters, whereas the newer Bluetooth versions may have expended range.

Figure 3:
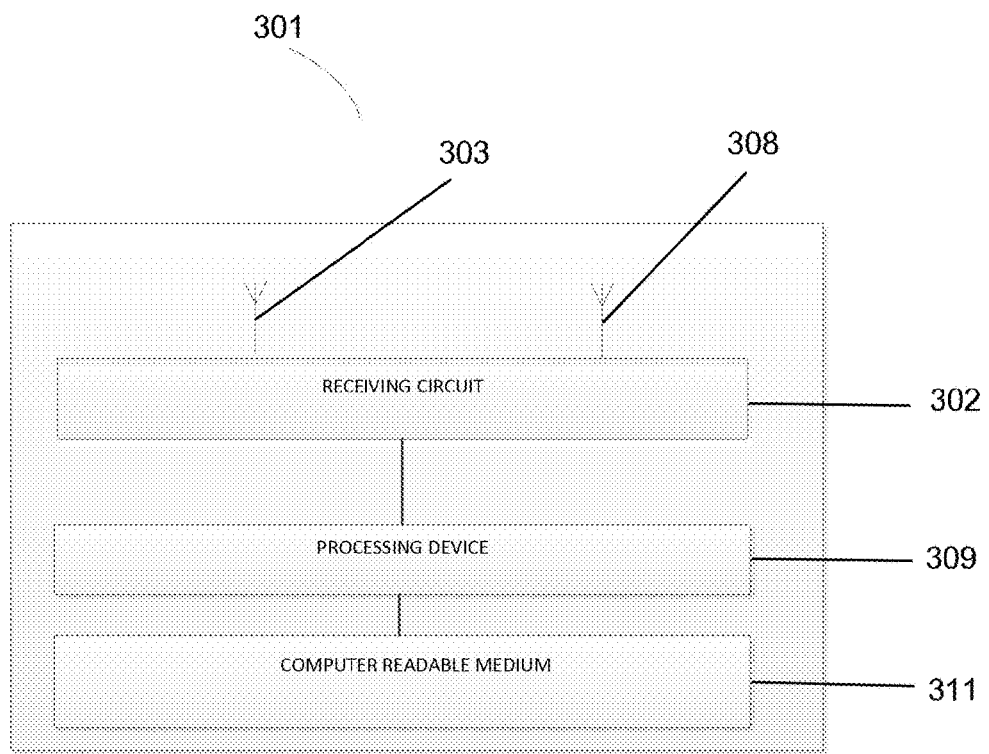
FIG. 3 illustrates an example of a monitoring device for tracking service queues according to an embodiment.

With reference to FIG. 3, a monitoring device 301 for use in a service queue tracking system may include one or more antennas 303, 308 for receiving wireless signals from one or more mobile wireless devices, a receiving circuit 302 for measuring the received signal strength (RSS) from the mobile wireless devices. In one embodiment, the monitoring device may include a single antenna or multiple antennas. When multiple antennas are used, the receiving circuit 302 may be designed to receive wireless signals from each of the antennas. The device 301 may also include a computer or processing device 309 that is communicatively coupled to a non-transitory computer readable medium, or memory 311 that contain programming instructions to cause the computing device 309 to perform various processing operations, which will be further described in this document.

In one embodiment the RSS can be measured a power level such as in mW or dBm. Alternatively, the RSS can be measured by a received signal strength indicator (RSSI) as used in the IEEE 802.11 system. In one embodiment, the monitoring device may be configured to receive RSS traces from only WiFi devices likely to be in the service queue by detecting the RSS of signals received from multiple WiFi devices and selecting those signals whose signal strength amplitude exceed a threshold, e.g. greater than 0.45 dBm. In one embodiment, the system may determine the RSS threshold by observing the RSS of a known wireless device placed in the queue close to the service point. The system may use the MAC address extracted from captured packets to identify different devices. Alternatively, when monitoring Bluetooth signals, which are discoverable within a shorter range than WiFi, this selecting step may not be needed because all devices captured by the Bluetooth dongle can be considered valid devices close enough to be within the service queue.

Figure 4:
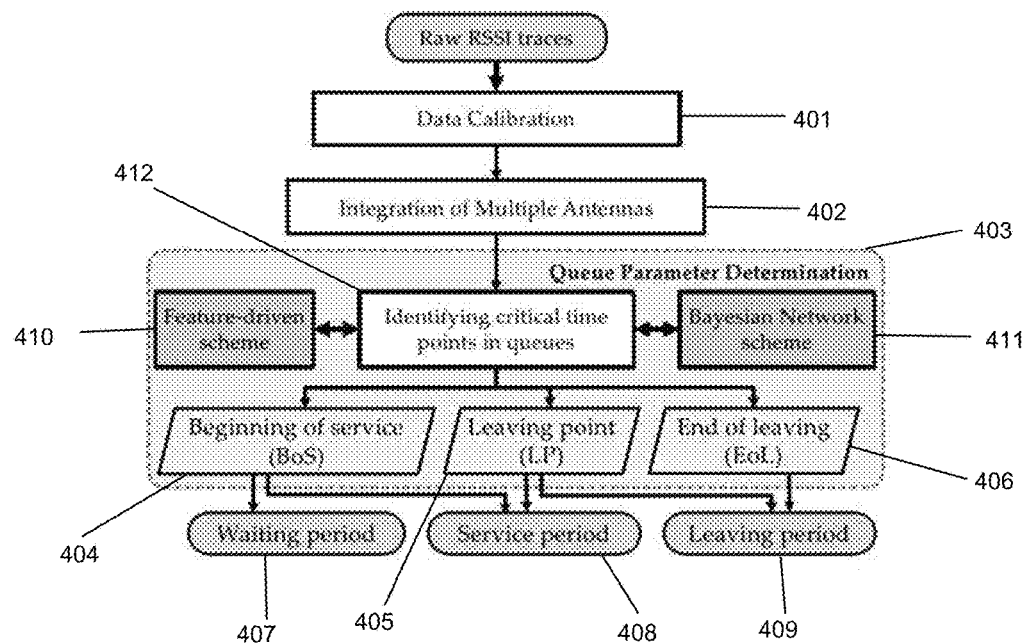
FIG. 4 shows a diagram for ascertaining the waiting period, the service period and the leaving period according to an embodiment.

With reference to FIG. 4, a method for determining the waiting period, service period and leaving period may include data calibration 401, integration of multiple antennas 402, and queue parameter determination 403. The data calibration 401 aims to remove the noise from the RSS traces, which may come from multi-path, shadowing, and fading components of signals as people move. The data calibration 401 may identify the relevant signal segment containing the queue process, and preserve the unique patterns in the signal trace. Integration of multiple antennas 402 combines wireless RSS traces from each antenna when the monitoring device is equipped with multiple antennas. This will improve the accuracy of the tracking system against various adverse conditions in the service queue. The queue parameter determination 403 may be designed to determine various critical time points and time periods 412 in the service queue from the received RSS traces.

Figure 5:
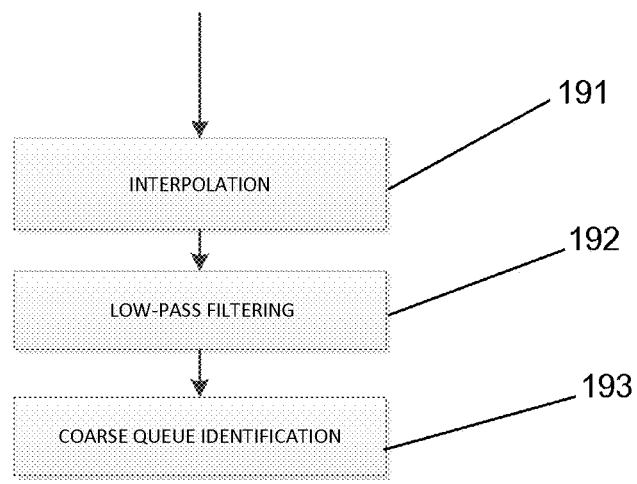
FIG. 5 shows a diagram for data calibration according to an embodiment.

With reference to FIG. 5, the data calibration is further explained in detail. In one embodiment, data calibration may include the steps of interpolation 191, low-pass filtering 192, and coarse queue identification 193. In one embodiment, data interpolation 191 includes interpolating the samples in the RSS traces in evenly spaced time series due to small variations in the samples. For example, even with an app broadcasting beacon packets periodically, the interval between two adjacent RSS samples can vary slightly due to packet delay. Given a sampled RSS trace starting at $t_0$, the samples may be interpolated at time points $[t_0, t_0+\Delta, t_0+2\Delta, \ldots]$, where $\Delta$ is the interpolation step. In one embodiment, the interpolation step of can be 0.5 s, 0.3 s, or 0.1 s, which can be small enough to produce sufficient samples for queue parameter determination.

Figure 6:
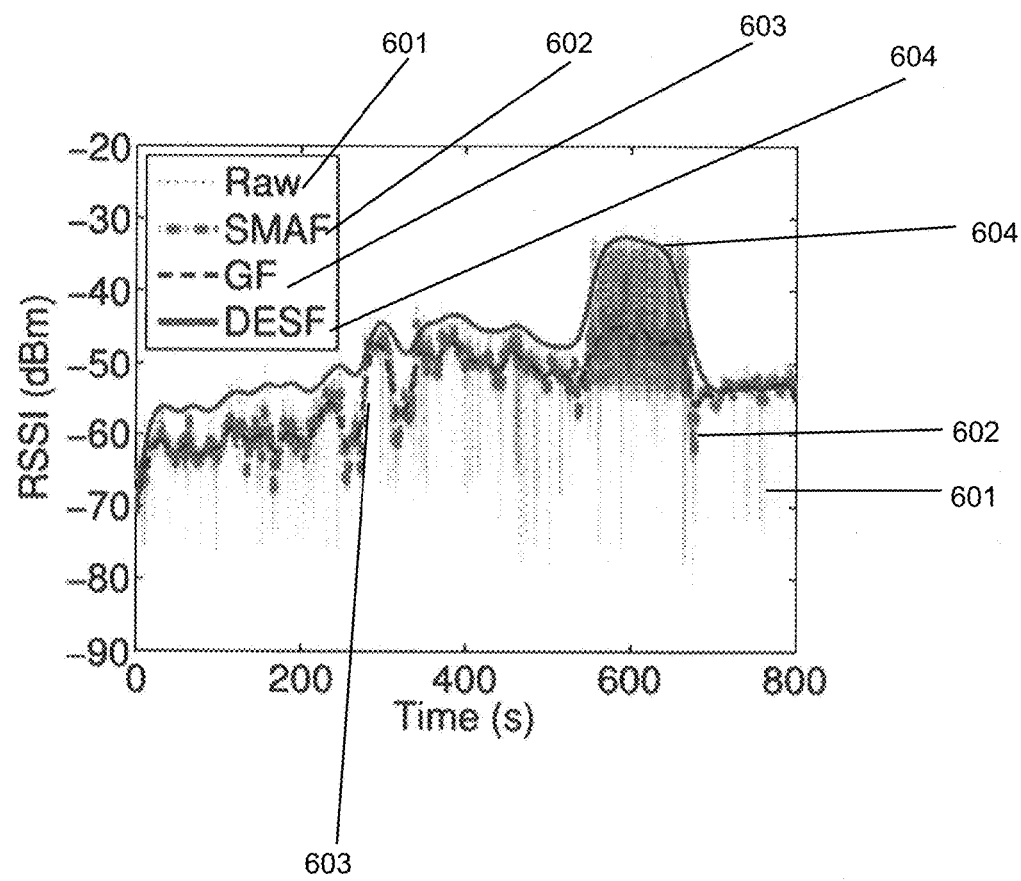
FIG. 6 shows a comparison of results from the simple moving average filter (SMAF), the dynamic exponential smoothing filter (DESF) and the Gaussian filter (GF) according to an embodiment.

With further reference to FIGS. 5 and 6, the low-pass filtering 192 aims to remove high frequency noise (due to environment dynamics) and yet capture the statistical features presented in the trace. In some embodiment, the system may use any of three low-pass filters such as a simple moving average filter (SMAF), dynamic exponential smoothing filter (DESF) and Gaussian filter (GF). FIG. 6 shows the raw RSS trace before the low-pass filter 601 and the resulting trace after applying these three filters. As can be seen from FIG. 6, both the SMAF 602 and the GF 603 can preserve the rough trend of the trace but fail to capture the exact time points when people arrive at the service desk and move away after receiving the service due to the slow roll-off and poor stop band attenuation. However, the DESF 604 not only returns the nicely fitted curve but also preserves those critical points in the RSS trace. This is because DESF is an exponential smoother that changes its smoothing factor dynamically according to previous samples. Accordingly, in one embodiment, the system uses the DESF to remove high frequency noise while preserving the features in the RSS trace. Specifically, the DESF can be implemented based on following equitation:

$$s_i = \begin{cases} \alpha \cdot s_{i-1} + (1-\alpha) \cdot x_i, & \text{if } x_i < s_{i-1} \\ (1-\alpha) \cdot s_{i-1} + \alpha \cdot x_i, & \text{if } x_i \geq s_{i-1}, \end{cases} \quad \text{Equation (6)}$$

where $s_i$ is the output sample and $x_i$ is the input sample, $s_{i-1}$ is the previous smoothed sample, a is the smoothing factor. In one embodiment, the smoothing factor can be chosen from (0.5, 1) to favor the samples with larger values.

Returning to FIG. 5, the coarse queue identification 193 is a step to identify the signal segment that belongs to the human service queue as the collected trace may include the periods that people have left the queue already but still within the monitoring range of the monitoring device. The irrelevant time periods contain useless information and may even affect the accuracy of queue parameter determination due to unpredictable behaviors of people after leaving the queue. The coarse queue identification will be further explained with reference to FIG. 7.

Figure 7:
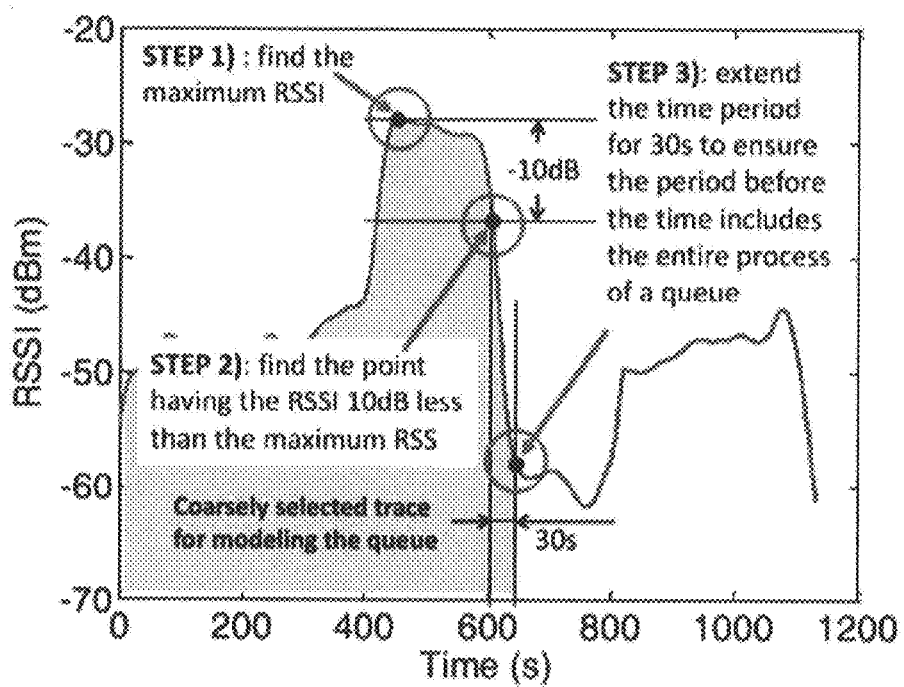
FIG. 7 illustrates an example of coarse queue identification according to an embodiment.

In FIG. 7, the coarse queue identification may include the steps of 1) finding the first time point having the maximum RSS of the entire trace; 2) examining the RSS after the first time point to locate the second time when the difference between the RSS value and the maximum RSS is larger than a threshold, for example 0.10 dB, which is large enough to cover the leaving period, and 3) identifying a removal point at a threshold period (e.g. 30 s, which is usually the leaving period) after the second time and removing the time periods after the removal point. These steps will ensure that the leaving time period is not excluded.

Returning to FIG. 4, in one embodiment, the method for tracking service queues further includes integration of multiple antennas 402 to filter out outliers and obtain a reliable RSS trace. This can be done by exploiting the availability of multiple antennas in the monitoring device. In one embodiment, the method may combine selected RSS traces from two antennas in the monitoring device to generate an integrated RSS trace that fortifies the unique pattern of RSS associated with the critical time periods of the service queue.

With further reference to FIG. 4, queue parameter determination can be implemented using feature-driven approach 410 or Bayesian Network 411, to identify the critical time points 412, e.g. BoS 404, LP 405, and EoL 406 in the service queue. The method may further determine the critical time points based on calculated BoS, LP and/or EoL. For example, the system may determine the waiting period 407 based on the BoS, in which the period before BoS is the waiting period. The system may further determine the service period 408, which is between the BoS and LP, and the leaving period 409, which is between the LP and EoL.

Figure 8:
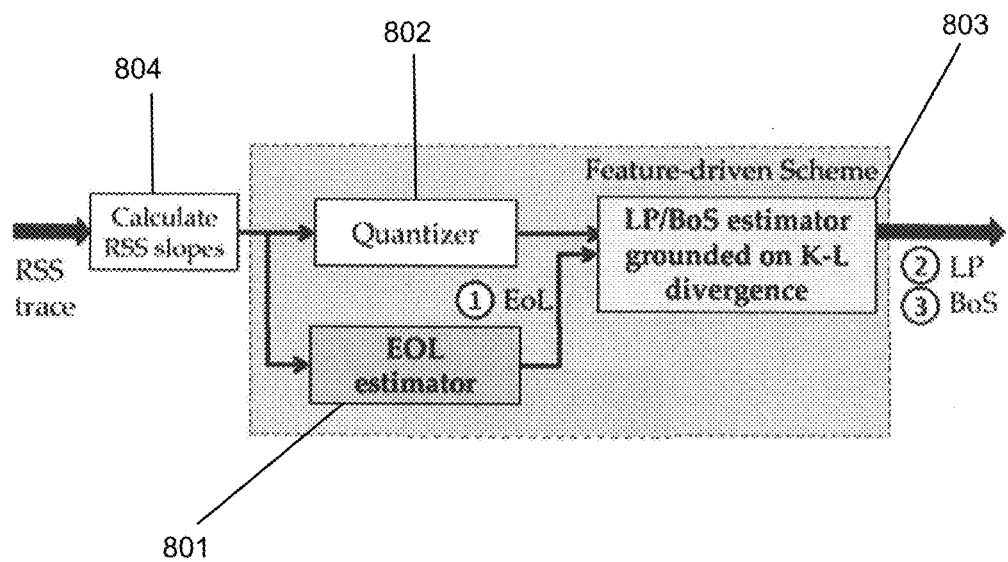
FIG. 8 illustrates the diagram of feature-driven scheme according to an embodiment.

In FIG. 8, the feature-driven method is further explained. In one embodiment, the system may generate the slope for the RSS trace 804. In one embodiment, the system may apply a first order linear regression to generate the slope for the RSS trace centered at each RSS sample. The system may perform a quantization 802 on the RSS slopes. For normalization and quantization, in one embodiment, the system may use 11 negative levels between $[-1, -0.9, \ldots, -0.1, 0]$ when estimating LP and 11 positive levels between $[0, 0.1, \ldots, 0.9, 1]$ when estimating BoS.

With further reference to FIG. 8, the feature-driven approach may utilize the unique features extracted from RSS traces to identify these time points. The method may use the features associated with the leaving period in the RSS trace to determine the EoL, LP, and BoS in a time-reversed manner. In particular, three features extracted from the RSS trace associated with the leaving period can be identified: 1) the leaving period has the longest consecutive negative-slope segments of the selected RSS trace; 2) the RSS values before the leaving period are stable with the highest amplitude of the selected RSS trace; and 3) the leaving period experiences the largest decrease of RSS in the selected RSS trace.

With further reference to FIG. 8, the feature-driven method may include three components: EoL Estimator 801, Quantizer 802, and LP/BoS Estimator 803. The EoL Estimator 801 will assess a group of M segments with consecutive negative slopes in the RSS trace $G=\{G_1, \ldots, G_M\}$, and each segment $G_i$ lasts for a period of $T_i = t^i_1 - t^i_0$, where $t^i_1$ and $t^i_0$ denote the starting time and the ending time of that segment, respectively. The EoL estimator 801 may determine the time $t^i_0$ to be EoL when a segment $G_i$ is most likely to be a leaving period. To determine the likelihood of being a leaving period 803, the method computes the significance of the three features described above as: as:

$$\frac{T_i}{\max(T)}, \quad 1)$$

where T denotes time length of all the segments in G;

$$\frac{S_i}{\max(S)}, \quad 2)$$

where $S_i$ is the average RSS over a time window L before $t_1^i$, and S denotes all such average RSS;

$$\frac{R_i}{\max(R)}, \quad (3)$$

where $R_i$ is the ratio of the RSS at $t_0^i$ and $t_1^i$, and R denotes all such RSS ratio, respectively. The method may further computes an utility function which is a weighted sum of the significance of the three features and can be defined as:

$$u_i = \frac{\alpha \cdot T_i}{\max(T)} + \frac{\beta \cdot S_i}{\max(S)} + \frac{\gamma \cdot R_i}{\max(R)}, \quad \text{Equation (1)}$$

where $\alpha$, $\beta$, and $\nu$ are the weights. The method thus may determine the leaving period (LP) as the segment $G_i$ that maximizes the utility function $u_i$. The method may identify the time $t_0^i$ of such a segment $G_i$ and declare it as the EoL.

In one embodiment, the method may use a heuristic approach to determine the weights in Equation (1). In one embodiment, the method may count the occurrence of each feature in a small portion of the collected traces (e.g., 20 traces) and respectively use the ratio of each feature's occurrence to the number of traces as their weights. For example, if feature 1 has been found true for 10 times in 20 traces, the weight for feature 1 is then 0.5. Based on experiments in different scenarios (e.g., the laboratory, a coffee shop, and the airport), the $\alpha=0.4$, $\beta=0.8$ and $\nu=0.8$. Thus, the unique features can be extracted from the RSS trace accurately.

Figure 9:
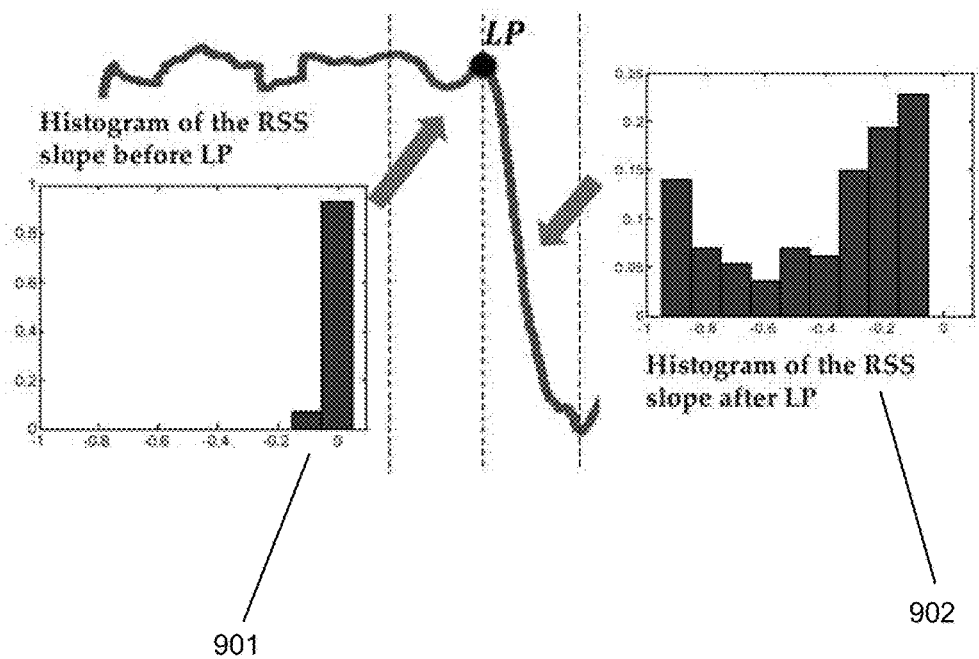
FIG. 9 illustrates an example of a histogram of the RSS slope before and after the leaving point (LP) from a RSS trace according to an embodiment.

With further reference to FIG. 8, the LP/BoS Estimator 803 takes the output from the EoL Estimator 801 and the output from the quantizer 802 to identify the leaving point (LP) and beginning of service point (BoS) in the queue following the temporal-reversed order. The LP/BoS Estimator takes the view point that the leaving point separates the service period and the leaving period, and thus the WiFi signals before LP is relatively stable whereas they drop dramatically after the leaving point. This can be illustrated in FIG. 9, which shows a histogram of the RSS slope before 901 and after 902 the leaving point (LP) from the RSS trace collected from a wireless device in queue. The observation of the histograms in FIG. 9 indicates that the distributions of WiFi signal changes (i.e., slopes of RSS) before and after the leaving point are significantly different. In one embodiment, the system may identify the LP by using the Kullback-Leibler (K-L) divergence technique to examine the distribution difference of WiFi signal changes, where the LP is determined as the time point (prior to EoL) separating the RSS slopes into two parts that present significantly different distributions from each other.

The determination of the LP by using a K-L divergence technique is further explained. The distributions of quantized RSS slopes can be calculated before and after each time point $t_j$ occurring before the EoL, respectively denoted as $P(K_{j-1})$ and $Q(K_j)$, $j=[1, \ldots, J]$, where J is number of time points occurring before EoL. The K-L divergence between these two distributions are derived as:

$$D_{KL}(P(K_{j-1}) | Q(K_j)) = \sum_{q \in Q} P(K_{j-1} = q) \ln \frac{P(K_{j-1} = q)}{Q(K_j = q)}, \quad \text{Equation (2)}$$

where Q is the set of all possible values for quantized RSS slopes. LP is then determined as the time point $t_j$, which maximizes the K-L divergence value:

$$t_j = \arg \max_{t_j} (D_{KL}(P(K_{j-1}) | Q(K_j))). \quad \text{Equation (3)}$$

Similarly, in one embodiment, the system may also employ the K-L divergence technique to identify BoS, since WiFi signals are relatively stable during the service period while they exhibit an obvious increasing trend in the waiting period.

Returning to FIG. 4, the queue parameter determination 403 may also use a Bayesian Network model 411, which can be designed to model the detection of BoS and LP as a probabilistic graph based on the statistics of features presented in RSS traces. For example, in one embodiment, the method can use a Directed Acyclic Graph (DAG) to represent conditional independencies among the features extracted from the RSS trace. In DAG, a node represents a random variable, while an arrow that connects two nodes represents a direct probabilistic relation. Such a graph is then utilized to construct a naive Bayesian classifier for LP and BoS determination.

Figure 10:
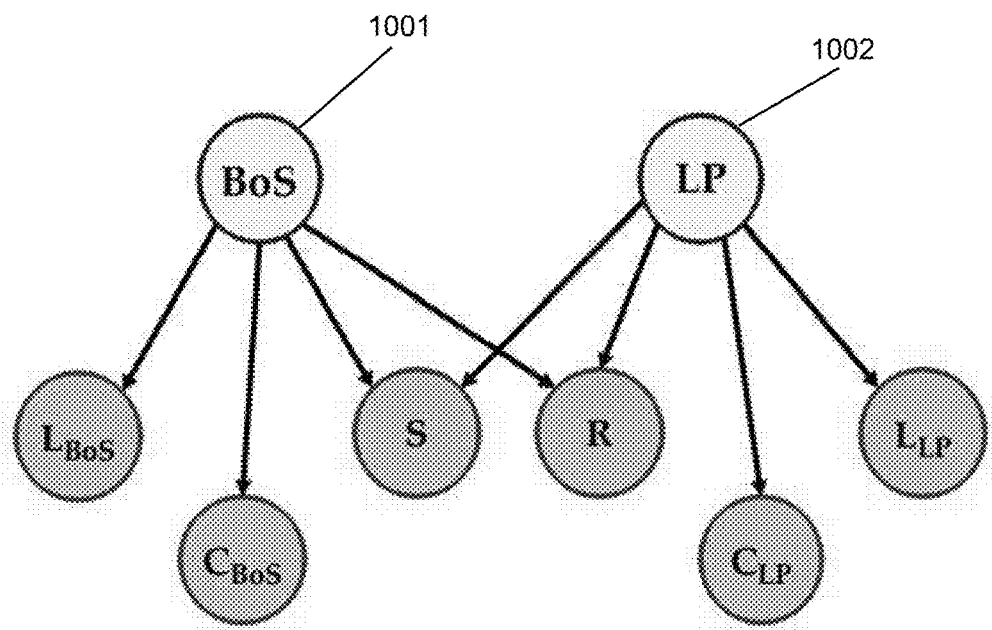
FIG. 10 shows a Bayesian Network model according to an embodiment.

With reference to FIG. 10, a Bayesian Network model for detecting the critical time points may include two parent nodes of BoS 1001 and LP 1002 and six attributes (Boolean random variables) based on the features embedded in the RSS trace when a wireless device is in a service queue. The six random variables, R, S, $L_{LP}$, $C_{LP}$, $L_{BoS}$, and $C_{BoS}$, can be represented as the child variables of BoS and LP in the Bayesian graphical model and can be computed from unique features embedded in the RSS traces. The corresponding random variables are defined as below.

R: The average RSS within the service period is usually the highest. R=1 when the mean RSS before a specific segment of continuous negative slopes is the highest of all, otherwise R=0.

S: The RSS within the service period is stable. S=1 when the variation of RSS within a window W before a segment of continuous negative slopes is smaller than a threshold $\tau$, otherwise S=0.

$L_{LP}$: The leaving period happens after the service period, which has the strongest RSS. $L_{LP}$=1 when the starting time of a specific segment of continuous negative slopes is later than the time with the highest RSS value, otherwise LLP=0.

$C_{LP}$: The change of RSS after the leaving period usually exhibits the most significant decreasing trend. $C_{LP}$=1 when the average slope of a specific segment of continuous negative slopes is the smallest of all, otherwise $C_{LP}$=0.

$L_{BoS}$: The waiting period happens before the service period, which has the strongest RSS. LBoS=1 when the end time of a specific segment of continuous positive slopes is earlier than the time with the highest RSS, otherwise $L_{BoS}$=0.

$C_{BoS}$: The change of RSS before the service period usually exhibits the most significant increasing trend. $C_{BoS}$=1 when the average slope of a specific segment of continuous positive slopes is the largest of all, otherwise $C_{BoS}$=0.

Figure 11:
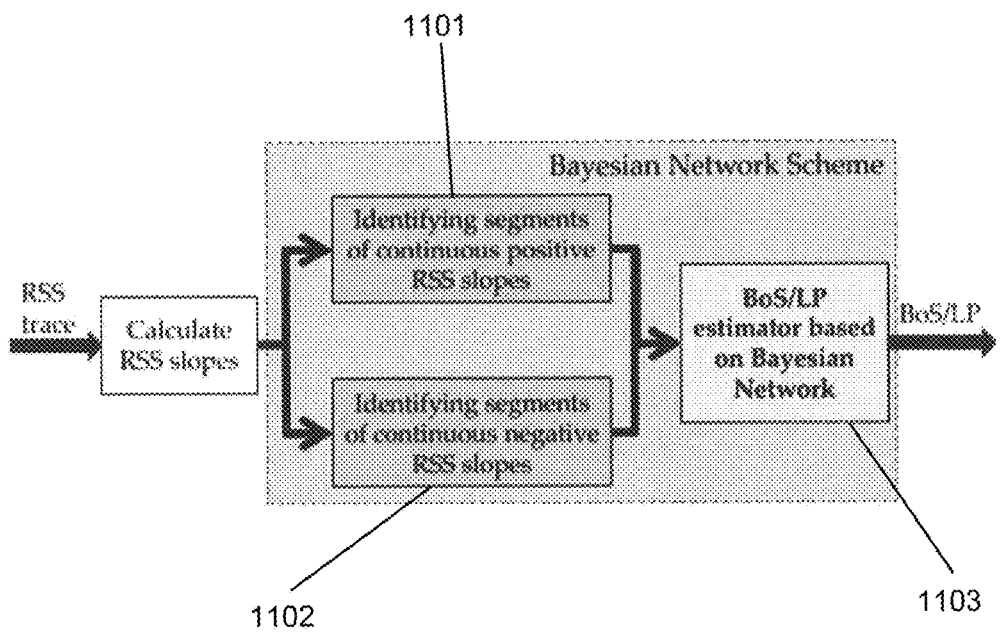
FIG. 11 shows a diagram of the Bayesian Network scheme according to an embodiment.

With reference to FIG. 11, the Bayesian Network scheme first identifies all the RSS segments containing continuous positive RSS slopes 1101 and continuous negative RSS slopes 1102 respectively in the RSS trace and use them as inputs to run BoS and LP estimation 1103 using the constructed Bayesian classifier.

In one embodiment, the Bayesian Network scheme has a set $\mathbb{U}$ of N segments with continuous positive slopes, and a set $\mathbb{G}$ of M segments with continuous negative slopes in the RSS trace. The naive Bayesian classifier considers the ending time of the segment $U_i \in \mathbb{U}$ with $\mathbb{I}$ continuous positive slopes as BoS when the segment $U_i$ maximizes the posterior probability:

$$\hat{U} = \arg\max_{U_i}\left(P(BoS)\prod_{I\in\mathbb{I}} P(I=1\mid BoS)\right), \quad \text{Equation (4)}$$

where $\mathbb{I} = \{R, S, L_{BoS}, C_{BoS}\}$, and $$P(BoS)\frac{1}{N}.$$

Similarly, the starting time of the segment $G_i \in \mathbb{G}$ with continuous negative slopes is considered as LP when the segment $G_i$ maximizes the posterior probability:

$$\hat{G} = \arg\max_{G_i}\left(P(LP)\prod_{F\in\mathbb{F}} P(F=1\mid LP)\right), \quad \text{Equation (5)}$$

where $$\mathbb{F} = \{R, S, L_{LP}, C_{LP}\}, \text{ and } P(LP) = \frac{1}{M}.$$

Alternatively, the $\mathbb{U}$ and $\mathbb{G}$ may contain segments of mostly positive slopes and mostly negative slopes in the RSS trace, respectively.

In one embodiment, a two-fold cross-validation approach can be used when applying the Bayesian Network scheme. For example, collected RSS traces are randomly separated from multiple wireless devices in a queue into two folds so as to use one fold as the training data to learn the probability of each random variable conditioning on its parent variable. The other fold is used as the testing data to obtain the estimation error. Then, these two folds are switched to calculate the estimation error again. The final estimation error of the system is the average of the estimation errors observed from previous two tests.

Figure 12:
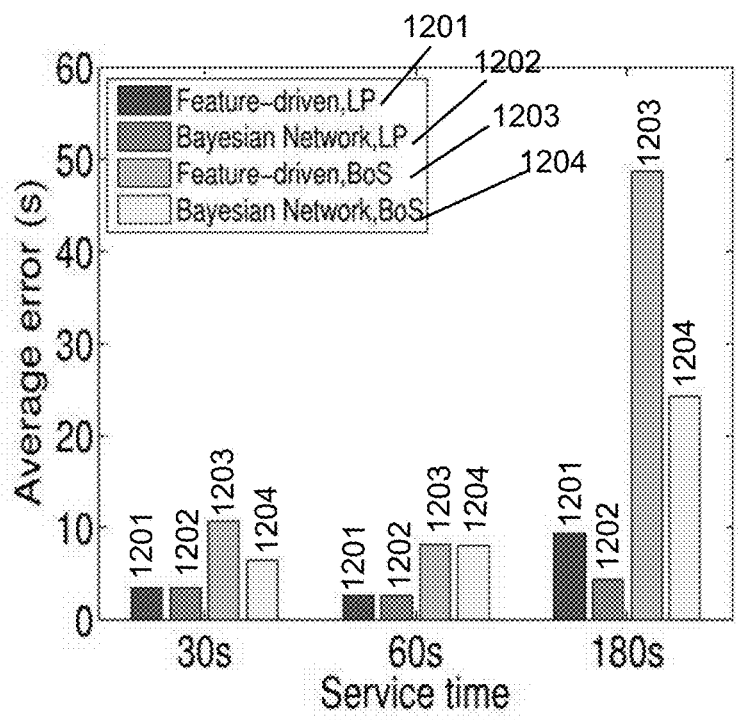
FIG. 12 shows the average error of estimating the LP and beginning of service (BoS) under different lengths of the service time for both feature-driven and Bayesian Network schemes based on the signals received from a single antenna of a monitoring device according to an embodiment.

With reference to FIG. 12, experiments are conducted for both feature-driven and Bayesian Network schemes based on the signals received from a single antenna at the WiFi monitor, and the average error of estimating the LP and BoS under different lengths of the service time is shown. The experiments use a WiFi monitor placed at the service desk to capture WiFi signals. A mobile app was developed to send beacon packets at the rate of 10 pkt/sec to simulate the normal WiFi traffic, such as the traffic generated by a commercial establishment's mobile app.

The experiments include three different service times, 30 s, 60 s, and 180 s, representing short, normal and long service times, respectively. In total, 90 traces were collected in the laboratory environment and a two-fold cross-validation was used for evaluation. The estimation error of the relevant time points and important time periods was calculated with regard to the manually logged ground-truth. The experiments include both line-of-sight and non-line-of-sight scenarios, since the signals from wireless devices can be blocked by human bodies in the queue.

Figure 13:
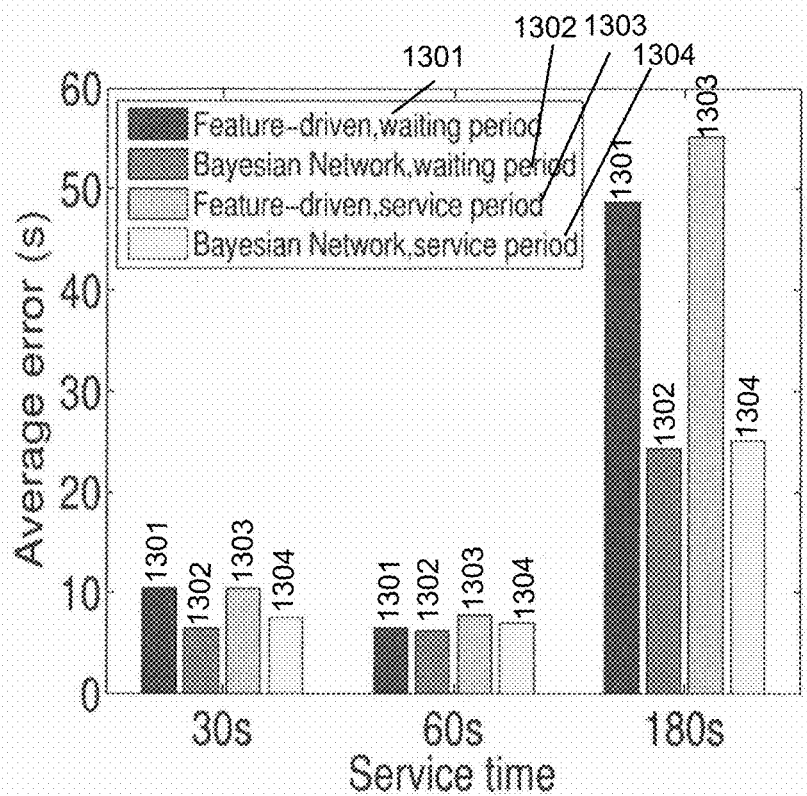
FIG. 13 shows the average error of tracking the waiting and service times derived from the estimated BoS and LP of FIG. 12 according to an embodiment.

FIG. 13 shows the average error of tracking the waiting and service times derived from the estimated BoS and LP of FIG. 12 based on the signals received from a single antenna at the WiFi monitor. It can be observed that the average error of both waiting and service times is less than 10 s under short and normal service times. Under the long service times, the BN scheme may outperform the feature-driven scheme, although both schemes experience performance degradation. This is because the BN scheme considers the conditional relationship among multiple features and thus places a tighter bound on the critical queue points estimation even when large RSS fluctuation is experienced during a long service time period.

Returning to FIG. 4, in some embodiments, two antennas at the monitoring device can be used. Thus, the method of tracking service queues may additionally include integration of multiple antennas. When multiple antennas are available, integration of signals from them may help to mitigate the multi-path effects and make the wireless signal reception robust to environment dynamics.

Figure 14:
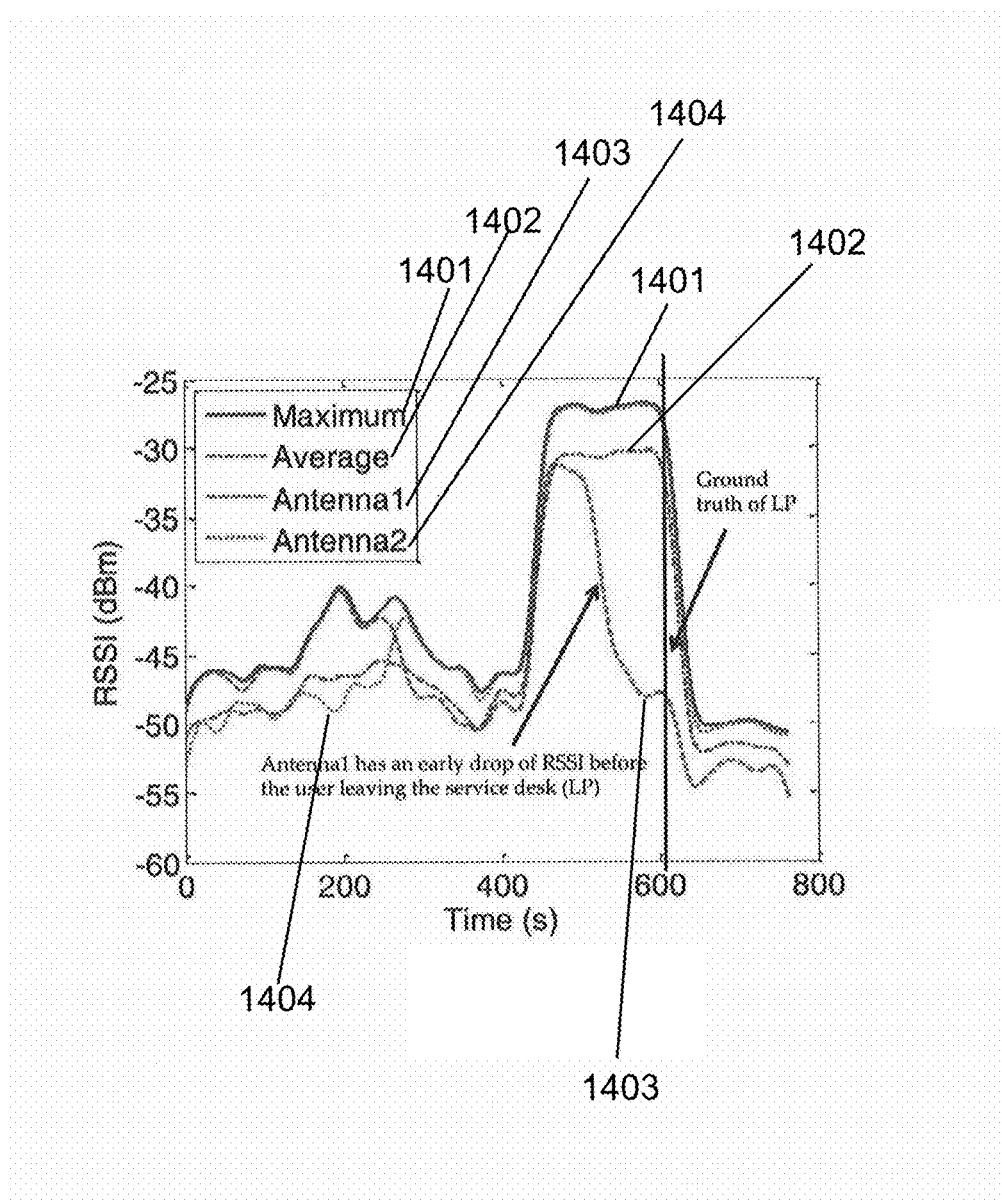
FIG. 14 shows RSS traces from two individual antennas and the two integrated RSS traces according to an embodiment.

With reference to FIG. 14, two strategies, i.e. averaging 1402 and maximum 1401 among the RSS traces from the two antennas, antenna 1 (1403) and antenna 2 (1404) are shown. As can be seen, although the RSS from the Antenna 1 drops quickly before reaching LP (affected by multi-path effects and dynamically changed environments), the integrated RSS traces 1401, 1402, both maximum and average, accurately reflect each critical time point in the queue.

Figure 15:
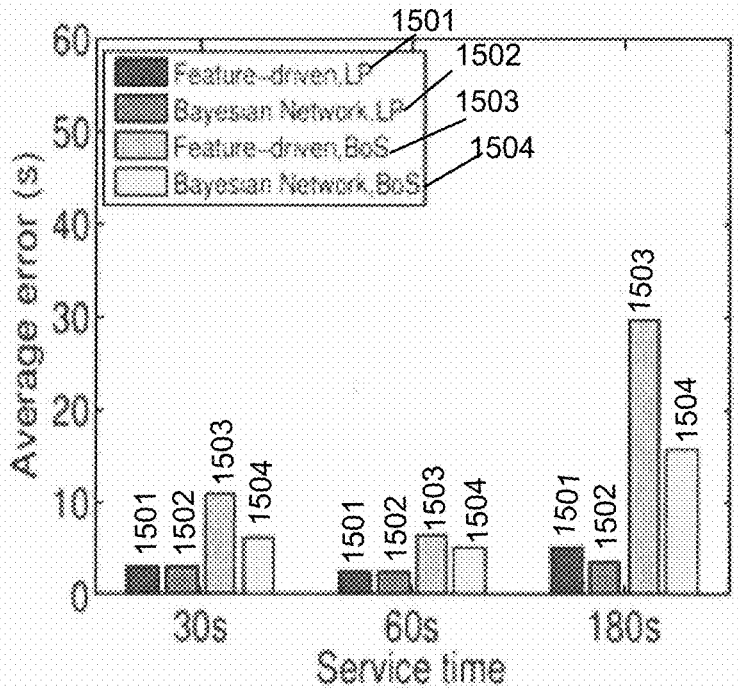
FIG. 15 shows the average error of estimating the LP and BoS under different lengths of the service time for both feature-driven and Bayesian Network schemes based on the signals received from two antennas of a monitoring device according to an embodiment.

FIG. 15 shows the average error of estimating the LP and BoS under different lengths of the service time for both feature-driven and Bayesian Network schemes based on the signals received from two antennas at the WiFi monitor.

Figure 16:
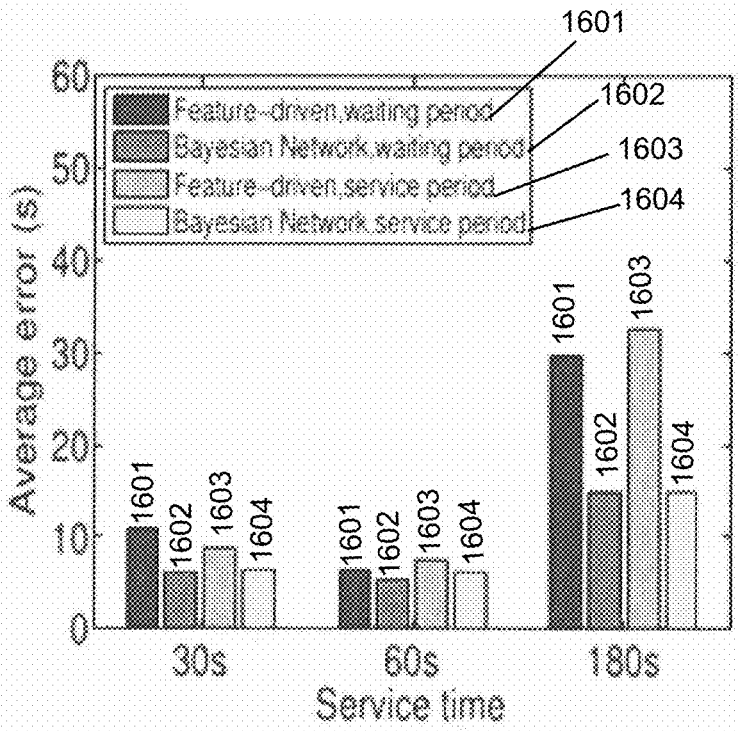
FIG. 16 shows the average error of tracking the waiting and service times derived from the estimated BoS and LP of FIG. 15 according to an embodiment.

FIG. 16 shows the average error of tracking the waiting and service times derived from the estimated BoS and LP of FIG. 15 based on the signals received from two antennas at the WiFi monitor. Both FIGS. 15 and 16 use the maximum signal integration strategy. Note that the average strategy results in similar performance. Comparing to single antenna results shown in FIGS. 12 and 13, the average error in both FIGS. 15 and 16 has been reduced significantly under the long service time, indicating the integration of multiple antennas is highly effective in reducing large errors caused by signal fluctuations.

In one embodiment, with the increasing usage of wireless devices, the tracking method may consider the scenario when multiple wireless devices are back-to-back, presenting in the queue, e.g. wireless devices 104, 105 (in FIG. 1). The time points, e.g. BoS and LP, of such back-to-back wireless devices have strong correlations. The BoS of the subsequent wireless device happens very soon after the LP of the prior neighbor wireless device. This kind of correlation among neighboring phones can contribute to reducing estimation uncertainties when tracking service queues.

Further, as can be observed in FIGS. 12, 13, 15 and 16, the LP estimation error can be 50% smaller than that of BoS, suggesting that the LP estimation of the prior phone can be leveraged as a reference to bound the BoS estimation of the subsequent phone in the queue. Thus, in one embodiment, the estimated BoS of the subsequent wireless device to the estimated LP of its prior neighbor phone can be compared. If the difference is larger than a threshold $\theta$, then the system may take the LP of the prior wireless device plus $\theta$ as the estimated BoS of the subsequent phone, otherwise the estimated of BoS is considered accurate. Theoretically the LP of prior phone should be the same as the BoS of the subsequent phone. However due to the delay of people's movement to the service desk, there could be a time difference between these two. Such a time delay is utilized to determine the θ, which can be about 5 s empirically.

Figure 17A:
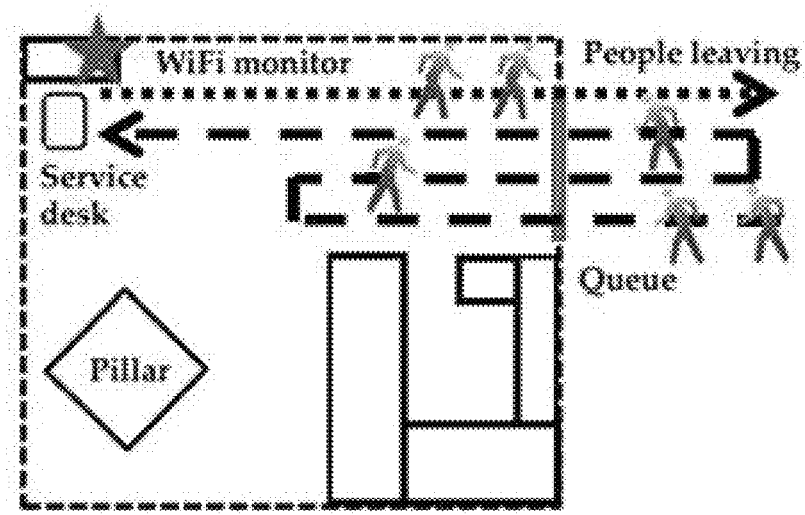
FIG. 17A-B illustrates a perpendicular service queue (17A) and the signal traces collected from the wireless devices in the perpendicular queue (17B) according to an embodiment.
Figure 18A:
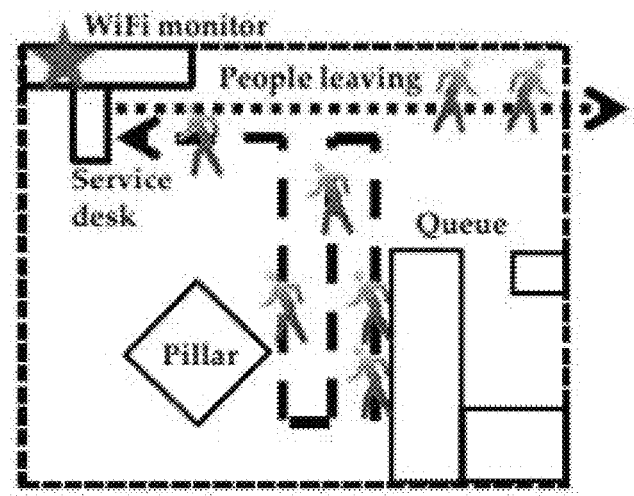
FIG. 18A-B illustrates a parallel service queue (18A) and the signal traces collected from the wireless devices in the parallel queue (18B) according to an embodiment.

In many scenarios, queues are formed not only in a straight line, but also in folding or zig-zag patterns with multiple subqueues. A general snaking queue includes subqueues with multiple straight lines. With reference to FIG. 17A, in a perpendicular snaking queue, the moving direction of the subqueues in the perpendicular queue is perpendicular to the service desk. With reference to FIG. 18A, in a parallel snaking queue, the moving direction of the subqueues is parallel to the service desk.

Figure 17B:
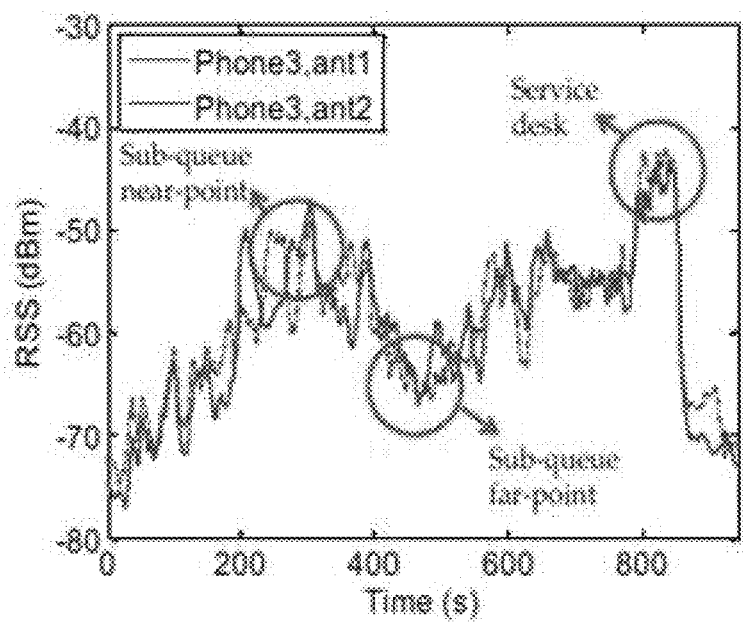
Figure 18B:
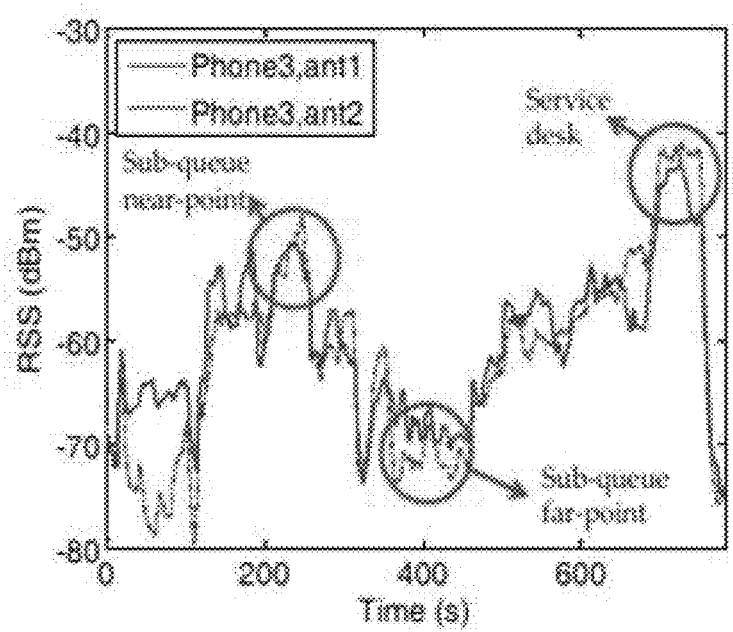

FIG. 17B depicts the signal traces collected from the perpendicular queue of FIG. 17A. FIG. 18B depicts the signal traces collected from the parallel queue of FIG. 18A. Both FIG. 17B and FIG. 18B show clear and slow up-down trends in the signal trace in either type of snaking queue, when the user moves from one subqueue to another. After the user receives the service and leaves the queue finally, a sharp signal drop is observed just as in the single-line queue.

In one embodiment, the system may use the maximum signal integration strategy to combine readings from two antennas before the queue parameter determination. Both the feature-driven and Bayesian Network schemes can achieve low estimation errors in each of these types of snaking queues. In one embodiment, the average LP and BoS estimation errors can be less than 6 s, and the average errors of waiting and service time's estimation are about 4 s and 8 s, respectively. These results are comparable to the ones obtained in single-line queues, which attributable to the fact that the system processes the RSS traces in a time-reversed manner, such that the largest signal drop (when the customer is leaving the service desk) and the highest and stable signal values (when the customer is receiving the service) are still preserved even though the RSS goes up and down when the users go through the snaking queues.

In some embodiments, the system and method require the WiFi interface to remain alive during the queue process, which can be implemented by enticing the customer to run loyalty app or customized app on the customer's smartphone. The customized app on the customer's smartphone will periodically broadcast beacons through the wireless device's WiFi, however, this may cause additional power consumption on the user's phone. For example, when a wireless device sends broadcasting beacon packets for 5 mins, with 10 pkt/s rate, it takes about 54.3 Joule, or 180 mW of the smartphone's power consumption is about. In one embodiment, the system customized app may be designed to reduce the packet sending rate, e.g. at 5 pkt/s, the system may achieve similar estimation accuracy while the power consumption on the smartphone is kept as low as 80 mW, which is much smaller than the average power consumption of a phone (e.g., a typical smartphone lasts 12.7 hours with average power of 450 mW).

In some embodiments, the signal monitoring device may also (1) filter out traces that do not possess the sharp drop signal pattern associated with leaving the queue, because this trace is likely incomplete; (2) aggregate multiple signal traces from different users in the queue to reduce the uncertainty of the queue parameter estimation; estimate the queue parameters accurately with the help from multiple wireless device users in the queue, although only a single phone user in the queue is sending a beacon signal. Alternatively and/or additionally, the signal monitoring device may be utilizing the existing access points (APs) to capture the WiFi traffic and perform queue measurements. When multiple APs are available, the accuracy of signal monitoring performance may even improve.

Alternatively and/or additionally, the signal monitoring device may be configured to measure the critical times in disorganized queues, such as those at bus stops or train-station platforms, where the service time is short (e.g., people getting on the bus) and there are no clear first-in and first-out (FIFO) service patterns. Other challenging queues are those in relatively small spaces without pronounced leaving patterns after the service. In such cases, additional or different features need to be identified for integration into the feature-driven and Bayesian Network schemes. For example, when dealing with disorganized queues, new unique features could include a constant observation of multiple mobile devices with stable or small-varying signals for a long period producing a temporal cluster (e.g., people waiting at the bus stop) followed by near-simultaneous departures (e.g., people getting on the bus and departing). These new features will help to estimate queue parameters.

Figure 19:
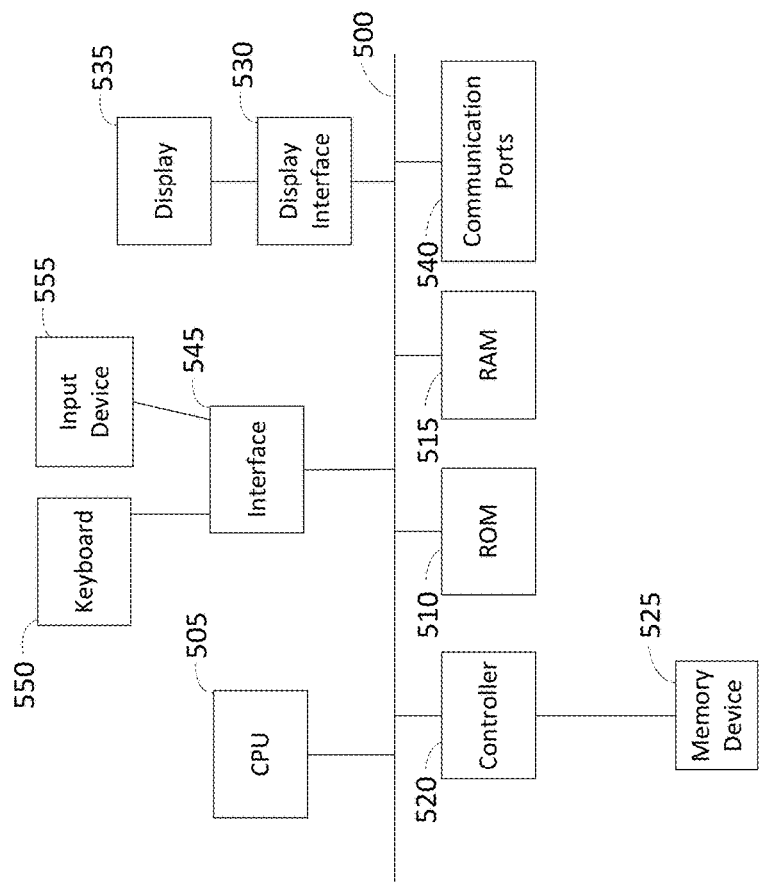
FIG. 19 is a block diagram of elements of a computing device on which the various systems and methods in this document could be implemented.

FIG. 19 depicts an example of internal hardware that may be included in any of the electronic components of the system, the monitoring device or another device in the system such as the monitoring device 101 (in FIG. 1). An electrical bus 500 serves as an information highway interconnecting the other illustrated components of the hardware. Processor 505 (CPU) is a central processing device of the device, configured to perform calculations and logic operations required to execute programming instructions. As used in this document and in the claims, the terms "processor" and "processing device" may refer to a single processor or any number of processors or processor cores in one or more processors. The device may include read only memory (ROM) 510, random access memory (RAM) 515, or other types of memory devices, such as flash memory, hard drives and other devices capable of storing electronic data. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

What is claimed is:

1. A device for tracking service queues, comprising:
   a first antenna configured to receive wireless signals from a plurality of mobile wireless devices, each wireless device representing a subject entering, being serviced in or leaving a service queue;
   a receiving circuit coupled to the first antenna and configured to measure a signal strength amplitude of the received wireless signals from the first antenna;
   a processing device communicatively coupled to the receiving circuit; and
   a non-transitory computer readable medium in communication with the processing device, the computer readable medium storing one or more programming instructions for causing the processing device to:
   receive a trace comprising a plurality of received wireless signal strength amplitudes from a selected one of the plurality of mobile wireless devices in a temporal order from a time the selected mobile wireless device enters a receivable range of the first antenna to a time the selected mobile wireless device exits the receivable range,
   determine a slope of the trace,
   identify first segments of the trace containing a mostly positive sloped received signal strength amplitude,
   identify second segments of the trace containing mostly negative sloped received signal strength amplitude,
   extract attributes from the first and second segments, and
   input the extracted attributes in a Bayesian Network model to compute a beginning of service and a leaving period of the service queue, wherein the Bayesian Network model comprises two parent nodes, each respectively modeling a beginning of service and a leaving period of a service queue;
   wherein the attributes comprise R, S, $L_{LP}$, $C_{LP}$, $L_{BoS}$, and $C_{BoS}$, wherein:
     R=1 when a mean RSS before a specific segment of continuous negative slopes is the maximum of all segments of the trace, otherwise R=0,
     S=1 when a variation of RSS within a window W before a segment of continuous negative slopes is smaller than a threshold, otherwise S=0,
     $L_{LP}$=1 when a starting time of a specific segment of continuous negative slopes is later than a time where a maximum RSS value occurs, otherwise LLP=0,
     $C_{LP}$=1 when an average slope of a specific segment of continuous negative slopes is the minimum of all segments of the trace, otherwise $C_{LP}$=0,
     $L_{BoS}$=1 when an end time of a specific segment of continuous positive slopes is earlier than a time where a maximum RSS value occurs, otherwise $L_{BoS}$=0, and
     $C_{BoS}$=1 when an average slope of a specific segment of continuous positive slopes is the maximum of all segments of the trace, otherwise $C_{BoS}$=0.

2. The device of claim 1 further comprising a second antenna configured to receive wireless signals from the plurality of mobile wireless devices, wherein:
   the receiving circuit is coupled to the second antenna and further configured to measure a signal strength amplitude of the received wireless signals from the second antenna; and
   the programming instructions for receiving a trace comprises additional programming instructions configured to maximize or average a first trace and a second trace, each comprising a plurality of received wireless signal strength amplitudes from a selected one of the plurality of mobile wireless devices in a temporal order from the time the selected mobile wireless device enters a receivable range of the first or the second antenna to the time the selected mobile wireless device exits the receivable range of the first or second antenna, respectively.

3. The device of claim 1, wherein the programming instructions further comprise additional programming instructions for causing the computing device to calibrate the received trace to remove noise from the received trace.

4. The device of claim 1, wherein the programming instructions for determining the slope of the trace comprise programming instructions for causing the computing device to apply a first order linear regression to generate the slope centered at each sample of the trace.

5. The device of claim 1, wherein the service queue is a parallel snaking queue or a perpendicular snaking queue.

6. The device of claim 1, wherein the selected wireless device has a signal strength amplitude received from the first antenna higher than a threshold value.

7. A method for tracking service queues, comprising:
   receiving, by a first antenna, wireless signals from a plurality of mobile wireless devices, each wireless device representing a subject entering, being serviced in or leaving a service queue;
   measuring, by a receiving circuit coupled to the first antenna, a signal strength amplitude of the received wireless signals from the first antenna;
   receiving, by a computing device coupled to the receiving circuit, a trace comprising a plurality of received wireless signal strength amplitudes from a selected one of the plurality of mobile wireless devices in a temporal order from a time the selected mobile wireless device enters a receivable range of the first antenna to a time the selected mobile wireless device exits the receivable range,
   determining, by the computing device, a slope of the trace;
   identifying, by the computing device, first segments of the trace containing a mostly positive sloped received signal strength;
   identifying, by the computing device, second segments of the trace containing mostly negative sloped received signal;
   extracting, by the computing device, attributes from the first and second segments; and
   by the computing device, inputting the extracted attributes in a Bayesian Network model to compute a beginning of service and a leaving period of the service queue, wherein the Bayesian Network model comprises two parent nodes, each respectively modeling a beginning of service and a leaving period of a service queue;
   wherein the attributes comprise R, S, $L_{LP}$, $C_{LP}$, $L_{BoS}$, and $C_{BoS}$, wherein:
     R=1 when a mean RSS before a specific segment of continuous negative slopes is the maximum of all segments of the trace, otherwise R=0,
     S=1 when a variation of RSS within a window W before a segment of continuous negative slopes is smaller than a threshold, otherwise S=0, $L_{LP}=1$ when a starting time of a specific segment of continuous negative slopes is later than a time where a maximum RSS value occurs, otherwise LLP=0;

$C_{LP}=1$ when an average slope of a specific segment of continuous negative slopes is the minimum of all segments of the trace, otherwise $C_{LP}=0$;

$L_{BoS}=1$ when an end time of a specific segment of continuous positive slopes is earlier than a time where a maximum RSS value occurs, otherwise $L_{BoS}=0$; and $C_{Bos}=1$ when an average slope of a specific segment of continuous positive slopes is the maximum of all segments of the trace, otherwise $C_{BoS}=0$.

8. The method of claim 7 further comprising:

measuring a signal strength amplitude of wireless signals from the plurality of mobile wireless devices received from a second antenna;

wherein receiving the trace comprises maximizing or averaging a first trace and a second trace, each comprising a plurality of received wireless signal strength amplitudes from a selected one of the plurality of mobile wireless devices in a temporal order from the time the selected mobile wireless device enters a receivable range of the first or second antenna to the time the selected mobile wireless device exits the receivable range of the first or second antenna, respectively.

9. The method of claim 7, wherein the service queue is inside a premises, and the method further comprises calibrating the received trace to remove noise from the received trace by:

interpolating the received trace;

applying a low-pass filtering to the received trace; and removing from the received trace one or more time periods that occur potentially after the selected wireless device moves outside the premises.

10. The method of claim 9, wherein removing the one or more time periods comprises:

determining a first time point having the maximum value of the trace;

determining a second time point after the identified first time point so that the difference between a RSS value at the first time point and that at the identified second time point is larger than a threshold; and identifying a removal point at a threshold period after the determined second time point and remove the time periods of the trace after the identified removal point.

11. The method of claim 7, wherein determining the slope of the trace comprises applying a first order linear regression to generate the slope centered at each sample of the trace.

12. The method of claim 7 further comprising using the computing device to:

receive one or training traces comprising a plurality of received wireless signal strength amplitudes from a selected one of the plurality of mobile wireless devices in a temporal order from a time the selected mobile wireless device enters a receivable range of the first antenna to a time the selected mobile wireless device exits the receivable range;

determine a slope for each of the one or more training traces;

from the slopes for one or more training traces, identify first segments of the trace containing a mostly positive sloped received signal strength and second segments of the trace containing mostly negative sloped received signal strength;

extract attributes from the first and second segments; and use the extracted attributes to train the Bayesian Network model.

\* \* \* \* \*